J. HOBDAY.
Determining the Sailing Trim of Vessels.
No. 3,264.
Patented Sept. 14, 1843.
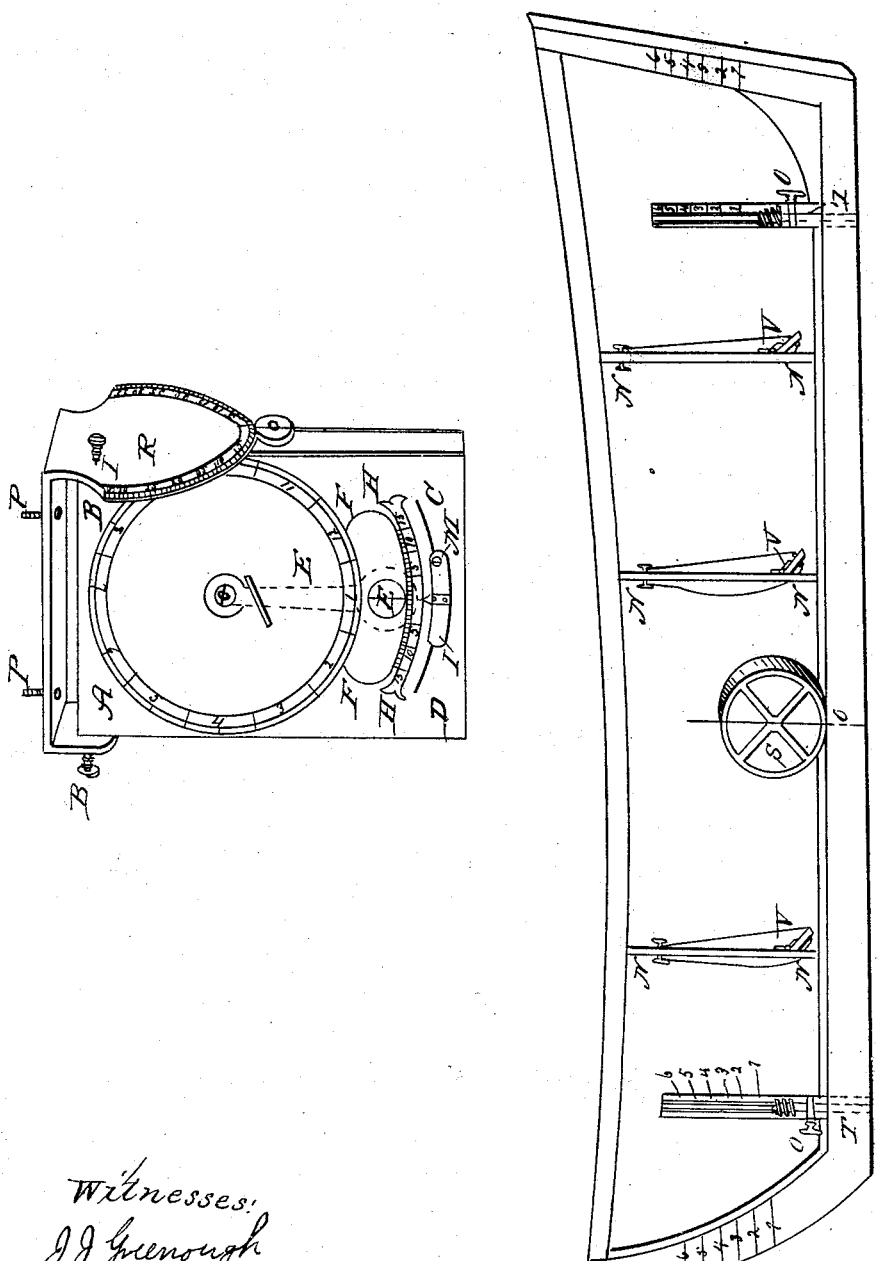

UNITED STATES PATENT OFFICE.

JOHN HOBDAY, OF PORTSMOUTH, VIRGINIA.

METHOD OF ASCERTAINING THE CENTER OF GRAVITY OF A VESSEL, ITS BEST SAILING TRIM UNDER VARIOUS DEPTHS, &c.

Specification of Letters Patent No. 3,264, dated September 14, 1843.

*To all whom it may concern:*

Be it known that I, JOHN HOBDAY, of the town of Portsmouth, county of Norfolk, and State of Virginia, have invented a new and useful apparatus and have discovered a method whereby I can find the best sailing trim of vessels at all the various drafts of water and ascertain and remedy any deviation from such trim, which may be occasioned by various causes, such as press of sail, the consumption of provisions or water from either aft or forward the center of gravity, or displacement of water, which will greatly aid the judgment, in finding the correct place for stepping the masts, storing the cargo, &c.; also find the true center of gravity or displacement of water; and also a new method for constructing models and testing the same, reference being had to the accompanying drawings.

Vessels are in their easiest trim and position on the water, as they sit when first launched, and at that draft of water; and will consequently sail best in that position. This proposition being admitted as I believe it must be by all, I proceed to make a mark No. 1 on the stem and stern post, at the water's edge. I then proceed to divide the vessel into sections by means of bulk-heads, crosswise. In each bulk-head I place a valve near the keel or keelson, to let the water pass freely through; I then let in a small quantity of water, sufficient to settle the vessel down a few inches, and then make a mark No. 2, at the water's edge on the stem and stern posts as before. I then proceed to No. 3 in the same manner, and repeat this operation, till the vessel is at her lowest draft of water and fully marked. I then close the valves. pump out the water, and ascertain the weight of water that each section contains. I now remove them, and mark the rind of the ship where the bulkheads were and also mark each section, showing the weight that each section will contain, and thus show the true tonnage of the vessel, or the weight that she will carry, and the proportion that should be placed in each section to bring her down to any two corresponding marks.

To find the center of gravity or displacement of water, I proceed in the following manner: I provide myself with a large iron drum and put into this drum, plates of lead until the weight of the drum shall equal that of the water, that brought the vessel down from mark No. 1 to mark No. 2; this drum I now roll forward or aft on the keel or lower deck until I bring No. 2 to the water's edge at each end of the vessel, I then suspend a plumb line from the center of each head of the drum, then remove the drum and strike a line across the keelson or lower deck, from each spot given by the plumbline; and that line will be the true center of gravity or displacement at that draft of water. Let this process be repeated for each corresponding mark on the head and stern, and you have the corresponding center of gravity or displacement, for each draft of the vessel.

Should the centers of gravity vary, or should there be more than one center (and there certainly will be, if the vessel is built on any plan, heretofore laid down) it will show that the model is incorrect, and consequently, that, there will be no definite place for stepping the masts, in consequence of the different centers of displacement at the various drafts of water; and this incorrectness will be in proportion as there are more centers, than one.

Now to correct the imperfections in the present models of vessels, I proceed on the following plan, I build a model of large dimensions, say 3 or 4 feet in length, and subject the same to the above mentioned process, until there shall be but one center of gravity or displacement of water, at the same time altering the model as may be necessary to obtain a correct one, still retaining the given dimensions of length, breadth and depth. The model should be built of some light wood, consisting only of the bottom of the vessel extending a little higher, than the highest lading mark. The true model being thus found, the vessel may be built accordingly.

If it is required to find the best sailing trim of vessels, already built; I build a model from the same draft, subject it to the above mentioned process of putting in the water, to find her natural position at the various drafts of water, which will be her best sailing trim. The model being built from the same draft that the ship was built from, and on a given scale, the tonnage of the ship will be proportional to that of the model, and should be marked accordingly; thus finding the sailing trim of the vessel at the various drafts, without subjecting the vessel itself to the process of putting in the water.

The masts and spars should be so arranged as to weight and position, as not materially to change the center of displacement; the guns and cargo, to be arranged in the same manner as far as practicable. If the vessel be a steamer, the same rule should be observed in putting in her cargo, machinery, &c., viz, to retain her best sailing trim. The same principles should be applied to boats of all descriptions, whether propelled by oars or sails the boat may be kept in trim, by changing the positions of the oarsmen, as they may differ in weight.

To indicate the depth, to which the vessel is immersed in water, I have a tube, (say one-half an inch in diameter,) passing through the keel, extending along the stem or stern posts; and then horizontally, along the lower deck to a stanchion or some convenient place of observation. This tube may be made of glass, and should be graduated, and marked, so as to correspond with the numbers on the stem and stern of the vessel. Water always seeks a level, hence, surface of the water in the tube will be on a level with that of the water in which the vessel is immersed. Observations may be made, either from the water in the tube, or by means of a float gage. There should be a stop cock, near the keel, to let the water in at pleasure. The advantage of this, is that the depth to which the vessel is sunk in the water, may be observed more readily, and in stormy and rough weather, as well, as in a calm.

Having described the manner in which a vessel may be put, and kept in trim; in order to indicate more readily, any deviation from such trim; there should be a pendulum suspended in the cabin, of which pendulum the following is an accurate description. The instrument consists of a pendulum, suspended between two plates of brass (or other metal) and connected by studs; this pendulum is designed to vibrate longitudinally or lengthwise of the vessel. The brass plates are represented in the accompanying drawings by letters A B C D, and the pendulum by E, which vibrates freely through the arc F F, and is suspended from the center G, which is also the center of the graduated arc H H and of the movable disk numbered from 1 to 12. I is an index or register, moving on an arc concentric with H H, also concentric with the arc described by the pendulum, and the periphery of the movable disk. K is an appendage annexed, to indicate if necessary the rolling or transverse motion of the ship. L, L are the points by which the instrument is suspended, and on which the whole instrument vibrates transversely or crosswise. The instrument is to be suspended in the longitudinal vertical plane, passing through the keel, known in naval architecture, as the "middle line." The particular trim or position of the vessel, which may be desirable to preserve, after obtaining it by the usual experiments, is indicated by the vertical line on the ball of the pendulum; the point of the movable index I is there made to coincide, with the vertical line aforesaid, and is secured by the screw M. Should any change occur in the given position or trim of the vessel, it will be shown by the departure of the pendulum from the index point. I bring the numbers on the movable disk, corresponding with the numbers on the stem and stern posts, which is at the water's edge; directly over the vertical line on the ball of the pendulum, the object of which is to register the different drafts of water in experiments to test the velocity of the vessel in different circumstances.

Of the many advantages of the principles herein laid down, it may be mentioned that the vessel built, and kept in trim in accordance with foregoing plan, will not be liable to "hog", as is the case with almost all large vessels; the vessel will "labor" less, and in consequence of diminishing, undue and excessive strain on any particular part of the vell, it will be much more durable.

A vessel built and fitted out in the manner above mentioned, will not only sail faster than one built on any other plan, but in consequence of a chase or other emergency, it should be necessary to spread more than the usual quantity of sail, the vessel will sink forward, in which case the pendulum will indicate the vibration from the best sailing trim, and the vessel may be trimmed accordingly, by moving some weight to the after part of the vessel.

What I claim as my invention and desire to secure by Letters Patent is—

The application of the above described process to the construction of models, lading vessels, and finding and preserving the true sailing trim of vessels at any draft of water, also finding the true center of displacement or center of gravity.

JOHN HOBDAY.

Witness:
C. M. HAND,